(12) United States Patent
Glaab et al.

(10) Patent No.: US 7,963,558 B2
(45) Date of Patent: Jun. 21, 2011

(54) METHOD FOR PRODUCING AN AIRBAG PACKAGE FOR AN AIRBAG MODULE

(75) Inventors: Ralf Glaab, Krombach (DE); Stefan Hamels, Aschaffenburg (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/656,275

(22) Filed: Jan. 22, 2010

(65) Prior Publication Data

US 2010/0164211 A1    Jul. 1, 2010

Related U.S. Application Data

(63) Continuation of application No. PCT/EP2008/061427, filed on Aug. 29, 2008.

(30) Foreign Application Priority Data

Sep. 12, 2007   (DE) .......................... 10 2007 043 936

(51) Int. Cl.
    *B60R 21/16* (2006.01)
(52) U.S. Cl. .......................... 280/743.1; 53/427; 53/429
(58) Field of Classification Search ............... 280/743.1; 53/417, 427, 429
    See application file for complete search history.

(56) References Cited

U.S. PATENT DOCUMENTS

| | | | | |
|---|---|---|---|---|
| 5,037,370 | A | * | 8/1991 | Sundberg ...................... 493/451 |
| 5,803,892 | A | * | 9/1998 | Marotzke ...................... 493/451 |
| 6,115,998 | A | | 9/2000 | Reh et al. |
| 6,248,052 | B1 | * | 6/2001 | Kleeberger et al. ........... 493/374 |
| 6,520,901 | B2 | * | 2/2003 | Nishijima et al. ............ 493/451 |
| 6,588,179 | B2 | * | 7/2003 | Haley et al. .................... 53/429 |
| 6,623,034 | B2 | * | 9/2003 | Dietsch et al. ............. 280/743.1 |
| 6,740,025 | B2 | * | 5/2004 | Bohn et al. ..................... 493/449 |
| 7,223,224 | B2 | | 5/2007 | Card et al. |
| 7,591,123 | B2 | * | 9/2009 | Eckert et al. ..................... 53/429 |
| 7,631,893 | B2 | * | 12/2009 | Eckert et al. ............... 280/743.1 |
| 2007/0108752 | A1 | | 5/2007 | Eckert et al. |
| 2007/0145724 | A1 | | 6/2007 | Miwa et al. |

FOREIGN PATENT DOCUMENTS

| | | |
|---|---|---|
| DE | 195 35 564 A1 | 3/1997 |
| DE | 10 2004 056 128 A1 | 1/2007 |
| EP | 1 349 724 B1 | 10/2003 |
| EP | 1 803 613 A1 | 7/2007 |
| WO | WO 2007/009416 A1 | 1/2007 |
| WO | WO 2007/118699 A1 | 10/2007 |

OTHER PUBLICATIONS

Examination report issued on Aug. 28, 2009 in German priority application No. 10 2007 043 936.0-56; 5 pages.

* cited by examiner

*Primary Examiner* — Toan C To
(74) *Attorney, Agent, or Firm* — Foley & Lardner LLP

(57) ABSTRACT

A method for producing an airbag package for an airbag module, which airbag package at least comprises an airbag and a protection covering surrounding the airbag is provided. The method using a first tool that comprises a recess for receiving the airbag package. The method comprising the steps of: covering the recess with an evenly outspread first protection covering part of the protection covering, folding the airbag, and inserting the folded airbag into the recess under interposition of the first protection covering part.

11 Claims, 3 Drawing Sheets

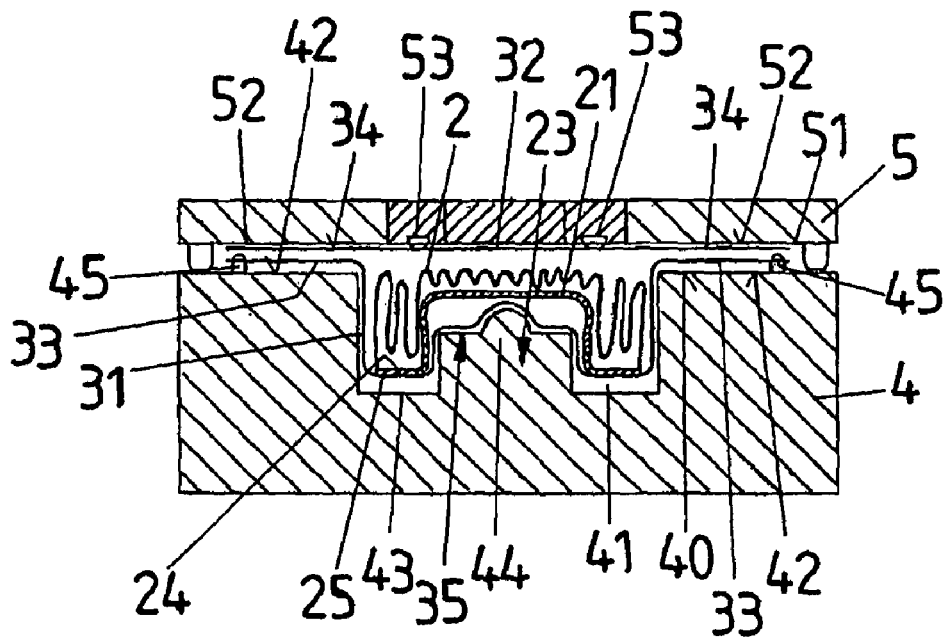
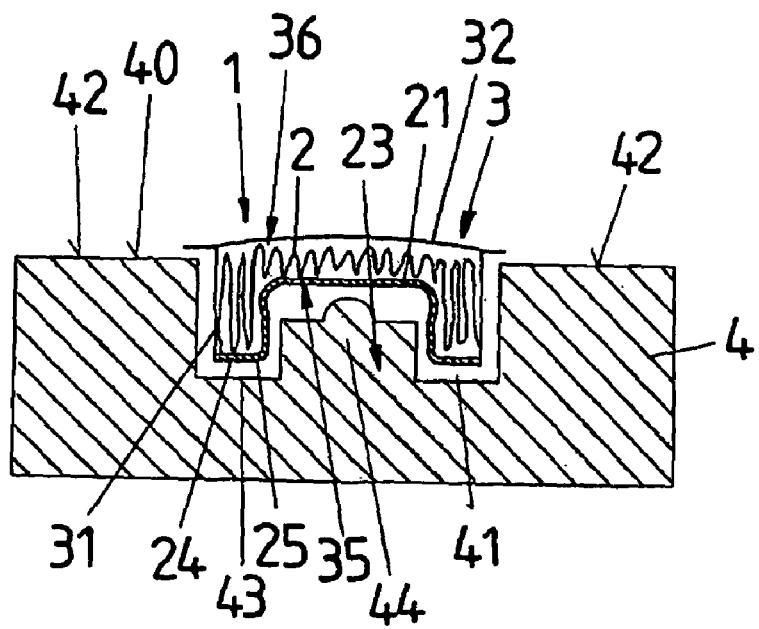

METHOD FOR PRODUCING AN AIRBAG PACKAGE FOR AN AIRBAG MODULE

CROSS-REFERENCE TO RELATED PATENT APPLICATIONS

This application is a Continuation of International Patent Application PCT/EP2008/061427, filed on Aug. 29, 2008, which was published in German on Mar. 19, 2009 as WO 2009/033962 A1. The foregoing International Application is incorporated herein by reference in its entirety.

BACKGROUND

The invention relates to a method for producing an airbag package for an airbag module comprising at least an airbag and a protection covering surrounding the airbag.

SUMMARY

The problem underlying the invention is to improve a method of the afore-mentioned kind.

According to an exemplary embodiment of the invention the method comprises the steps of: covering the recess of the first tool with an evenly outspread first protection covering part as an element of the protection covering, folding the airbag in front of the covered recess, and inserting the folded airbag into the recess, so that the first protection covering part is arranged between the airbag and a wall of the recess limiting the recess.

Due to the method according to this exemplary embodiment of the invention, a pre-forming of the elements of the protection covering (first protection covering part) is abdicable. Exemplary, the protection covering or its protection covering parts are formed expandable. Exemplary, the first protection covering part or the protection covering is formed flexible and elastic (resilient) and is exemplary formed by a film. The expansibility of the first protection covering part (or the protection covering) lies exemplary in the range of 300% and above. An expansibility of 600% and above is advantageous as well. Therefore, the protection covering takes its final form only after the evacuation. Thereby, the protection covering shrinks or expands until it takes the shape of the folded airbag, i.e., the protection covering can fill hollow spaces of the folded airbag that are communicating with the exterior space or are residing at the surface of the folded airbag, so that nearly no air remains in the airbag package. Elastic or resilient thereby means in particular, that the protection covering tends to take an unexpanded initial state.

Exemplary, the airbag gathered above the recess is pressed into said recess of the first tool by means of a second tool. Hereto, the first protection covering part is preferably fixed to the first tool, so that it covers the recess. This effects that the first protection covering part is arranged into the recess under expansion of the first protection covering part upon pressing of the airbag package into the recess and thereby exemplary adapts to a wall limiting the recess. Further, the first protection covering part is pretensioned against the airbag.

It is also possible not to fix the first protection covering part to the first tool so that the first protection covering part slips in said recess upon insertion of the airbag into the recess.

For closing the protection covering, a second protection covering part of the protection covering is provided that exemplary comprises the same properties like the first protection covering part and that is arranged at a surface of the second tool facing the recess for closing the protection covering, so that the second protection covering part upon movement of the second tool towards the first tool is pressed against the folded airbag. Thereby, a contact area of said surface of the second tool is pressed against a contact area of the first tool limiting the recess under interposition of a circumferential outer boundary area of the second protection covering part and a circumferential outer boundary area of the first protection covering part, so that both boundary areas are pressed against each other and the airbag is enclosed between both of the two protection covering parts.

Afterwards the boundary areas of the two protection covering parts are connected to each other, particularly by means of welding or gluing. Hereto, the contact areas may be formed partially heatable.

Exemplary, an area for generating an indentation of the airbag package protrudes from a bottom of the recess of the first tool. I.e., upon insertion of the airbag into the recess of the first tool (under interposition of the first protection covering part) the first protection covering part is pressed against said protruding area, so that an indentation corresponding to the shape of said area is formed in the first protection covering part and in the airbag arranged behind it. The height of said area with respect to the bottom of the recess of the first tool thereby determines the depth of the indentation of the airbag package. In order to adapt the indentation with respect to its depth in the airbag package to the respective desired circumstances, the height of the protruding area with respect to the bottom of the recess is preferably variably adjustable. This may take place for example by a continuous or staged movement of the protruding area with respect to the bottom, wherein this movement essentially runs perpendicular to the ground surface of the bottom. I.e., in this embodiment of the invention, the protruding area is retractable into the recess in different manners or is formed extendable out of the recess.

In order to allow for a better adaptability of the dimensions of the recess with respect to airbag packages of different size that are to be produced, the cross section of the recess can be exemplary reduced by the insertion of a limiting element. Preferably, this insertion takes place prior to a welding of the protection covering of the airbag package in order to allow for an adaptation of the size of the airbag package to be produced to the reduced size of the forming recess. Due to the employment of a limiting element, it is possible that the recess is significantly larger than the desired size of the airbag package. The actual size of said airbag package is then determined (at least in two dimensions) by means of the limiting element.

Furthermore, prior to folding the airbag, a diffuser for vortexing a gas stream can be arranged in an interior space of the airbag through an inlet opening of the airbag. The diffuser comprises a convex shape that corresponds to the later indentation of the airbag package, i.e., the diffuser surrounds said indentation.

In order that the protection covering can tear open upon inflation of the airbag, a tear line is exemplary formed by means of a second tool on the second protection covering part. For this, the second tool can stamp the tear line into the protection covering (second protection covering part) mechanically or by heating the second protection covering part.

In order to compact the airbag package, the protection covering is evacuated prior to closing the protection covering, wherein the protection covering tightly adapts to the folded airbag under expansion. Evacuation thereby means, that a pressure is provided inside the protection covering that is considerably smaller than the air pressure of the atmosphere surrounding the airbag package.

Furthermore, the problem according to an exemplary embodiment of the invention is solved by means of a folding device for producing an airbag package for an airbag module comprising at least an airbag and a protection covering surrounding the airbag. The folding device thereby comprises a first tool having a recess for receiving the folded airbag under interposition of a first protection covering part of the protection covering, as well as a second tool that is formed for pressing a folded airbag against the first protection covering part, in order to insert the airbag and the first protection covering part butting against the airbag into the recess.

Exemplary, the first tool of the folding device comprises a fixation means for fixing the first protection covering part, so that the first protection covering part fixed to the first tool by means of the fixation means dimensionally covers the recess of the first tool. Exemplary, the second tool is designed for pressing the folded airbag in such a manner against the first protection covering part fixed to the first tool, so that this first protection covering part is arranged in the recess under expansion, i.e., enlargement of its surface and at the same time reduction of its thickness. For forming the already explained indentation of the airbag package, the recess of the first tool comprises a bottom having an area protruding therefrom. The recess itself as well as said area of the bottom are exemplary formed cylindrically and are oriented coaxially with respect to each other.

The protruding area can be formed movable with respect to the bottom, in order to vary its height essentially perpendicular with respect to the bottom. In this way, the folding device can be adapted especially easily for different indentations (that means for differently shaped airbag packages).

In order to also adapt the recess to different airbag package shapes or sizes, the folding device exemplary comprises a limiting element that can be particularly inserted into the recess essentially perpendicular with respect to the bottom. Thus, the cross section of the recess is reduced, so that the airbag package to be formed comprises a small cross section as well.

Furthermore, the problem according to an exemplary embodiment of the invention is solved by means of an airbag package that comprises a folded airbag and an evacuated protection covering surrounding the airbag, which protection covering is formed by expandable protection covering parts in the form of flexible films, so that the protection covering tightly butts against the airbag after evacuation. Exemplary, said expandable protection covering parts (or the protection covering) comprise an expansibility of at least 300%. Thereby, the expansibility states the elongation of the protection covering parts or the protection covering in percent under load until the breakdown (tearing). Thereby, the protection covering parts are exemplary resilient, i.e., formed elastically and thus have the property to go back to their initial (unexpanded) state. Hereby, the protection covering enclosing the airbag is at least in sections (with a force corresponding to the elasticity) pretensioned against the airbag and thus contracts about said airbag. Hereby, an evacuation of the protection covering is eventually abdicable.

For housing a gas generator or for fastening the airbag package to a module mount, the airbag package comprises exemplary an indentation (bulge) whose shape is predetermined by a cap shaped diffuser that is formed convex and arranged at the gas generator.

BRIEF DESCRIPTION OF THE DRAWINGS

Further particulars and advantages of the invention are clarified by means of the following description of embodiments with reference to the Figures.

FIG. 3 shows a schematic cross section of the device shown in FIGS. 1 and 2, wherein the airbag is pressed into a recess of a first tool by means of a second tool, so that both protection covering parts surround the airbag.

FIG. 4 shows a schematic cross section of the device shown in FIGS. 1 to 3 after connecting both protection covering parts.

DETAILED DESCRIPTION

Figure 1:
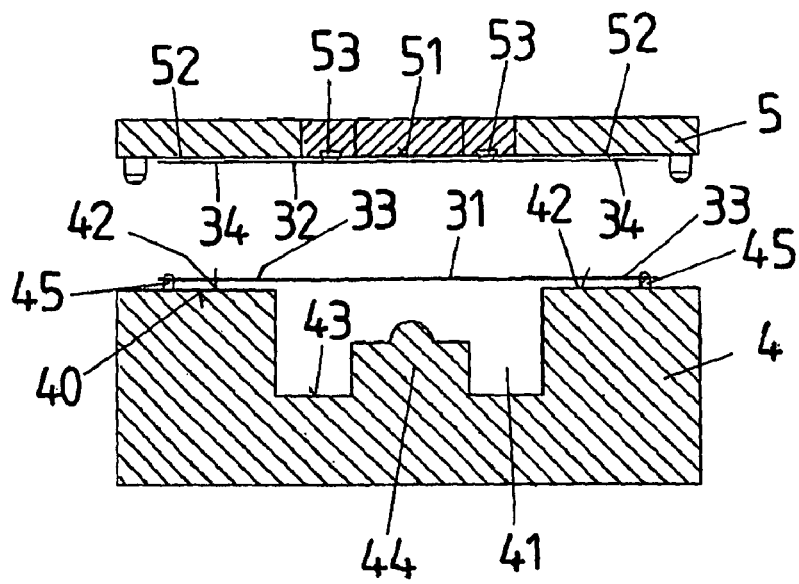
FIG. 1 shows a schematic cross section of a folding device for producing an airbag package having two tools for enclosing an airbag between two protection covering parts.
Figure 2:
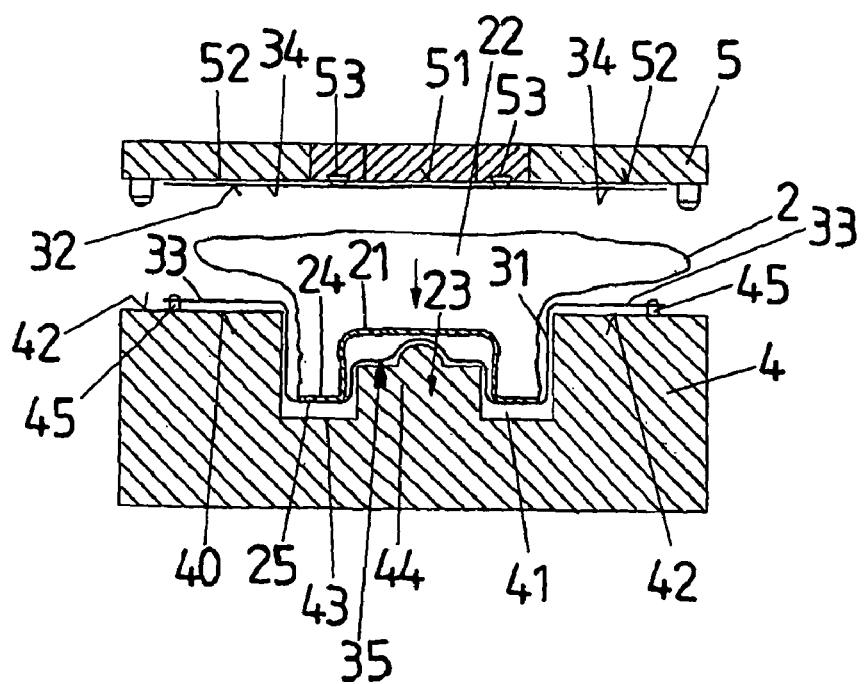
FIG. 2 shows a schematic cross section of the device shown in FIG. 1 having an airbag arranged between the two protection covering parts.

FIG. 1 shows in conjunction with FIGS. 2 to 3 a folding device for producing an airbag package 1 for an airbag module comprising at least an airbag 2 and a protection covering 3 surrounding the airbag 2, wherein the protection covering 3 consists of two protection covering parts 31, 32 that consist of a highly elastic (resilient) film whose expansibility is preferentially 300%.

The folding device comprises at least a first and a second tool 4, 5 of which the first tool 4 serves for pressing a folded airbag 2 into a recess 41 of the second tool 5.

The first tool 4 comprises a body having a planar surface 40 comprising a recess 41, which surface 40 is formed as a basis for the first protection covering part 31 that is to be spread there upon, wherein the first protection covering part 31 is arranged sheet-like in its state in which it is arranged with respect to the first tool 4 as intended and covers the recess of the first tool 4. For fastening the sheet-like spreaded first protection covering part 31 above the recess 41, fixation means 45 in the form of pins protruding from said surface 40 are provided at said surface 40 of the first tool 4, which pins can engage through openings which are formed in the first protection covering part 31. Since the first protection covering part 31 is formed expandable, the first protection covering part 31 can be attached to said surface 40 also under tension, i.e. firm, by means of the fixation means 45.

The recess 41 is blindhole-shaped, namely preferentially cylinder-shaped having a bottom 43 that extends parallel to said surface 40 of the first tool 4. A cylinder-shaped area 44 protrudes from the bottom 43 along the cylinder axis of the cylinder-shaped recess 41, which area 44 serves for forming an indentation 35 in the airbag package 1. Thus, the indentation 41 forms a negative shape for the airbag package 1 that is to be produced.

For forming the airbag package 1, the airbag 2 is initially arranged onto the first protection covering part 31 fixed to the first tool 4 and is folded up or folded to a package, so that the package is arranged above the recess 41. The airbag 2 comprises an interior space 22 which can be filled with gas through an inlet opening 23. For vortexing the gases that are to be discharged into the airbag 2 a cap-shaped diffuser 21 is arranged in the interior space 22 of the airbag 2, which diffuser 21 comprises a convex bulge towards the interior space 22. The diffuser 21 comprises a circumferential boundary area 24 which serves for fastening a boundary area 25 of the inlet opening 23 limiting the inlet opening 23, for example by clamping the boundary area 25 of the inlet opening 23 by means of the boundary area 24 of the diffuser 21 to a mount.

After arranging the airbag 2 above the recess 41, the folded up airbag 2 is pressed into the recess 41 by means of the second tool 5, wherein the first protection covering 31 is expanded due to the fixation to the first tool 4 and is pressed into the recess 41 by means of the airbag 2. Additionally, an indentation 35 is pressed into the first protection covering part 31 and the folded up airbag 2 residing behind it, since the first protection covering part 31 including airbag 2 is pressed against the protruding area 44 of the bottom 43. The indentation 35 corresponds to the convex bulge of the diffuser 21.

For covering the airbag 2 with a second protection covering part 32, the latter is fixed to a surface 51 of the second tool 5 that faces the first tool 4 so that it extends two-dimensionally along said surface 51. For retaining the second protection covering part 32, low-pressure nozzles 53 may be provided at the second tool 5, which nozzles 53 absorb the second protection covering part 32 in order to retain it.

In case the second tool 5 is now brought to butt against the surface 40 of the first tool 4 with its surface 51 under interposition of the protection covering parts 31, 32, in order to arrange the airbag 2 in the recess 41 of the first tool 4, a contact area 52 of the second tool 5 presses a circumferential outer boundary area 34 of the second protection covering part 32 against a circumferential outer boundary area 33 of the first protection covering part 31 that is supported on a contact area 42 of the first tool 4 limiting the recess 41. Hereby, the airbag 2 is enclosed between the two protection covering parts 31, 32.

In order to finally form the protection covering 3, the inner area surrounded by the protection covering parts 31, 32 is initially evacuated, so that the highly elastic, expandable protection covering (film) 3 contracts about the airbag 2. In this way, the protection covering 3 tightly adapts to the airbag 2 and compacts the airbag package 1. Afterwards, the boundary areas 33, 34 of the protection covering parts 31, 32 abutting against each other are welded to one another. For this, at least one of the both contact areas 33, 34 is formed heatable. Furthermore, a tear line 36 can be stamped into the second protection covering part 32 of the protection covering 3 by means of the second tool 5.

The protection covering 3 formed in this manner surrounds with its first protection covering part 31 the folded airbag 2 (including diffuser 21) in a pot-like manner; the cover surface of the protection covering defined by the first protection covering part 31, which—related to a state in which it is arranged in a motor vehicle as intended—faces a person to be protected, is formed by the second protection covering part 32 connected to the first protection covering part 31.

Figure 5:
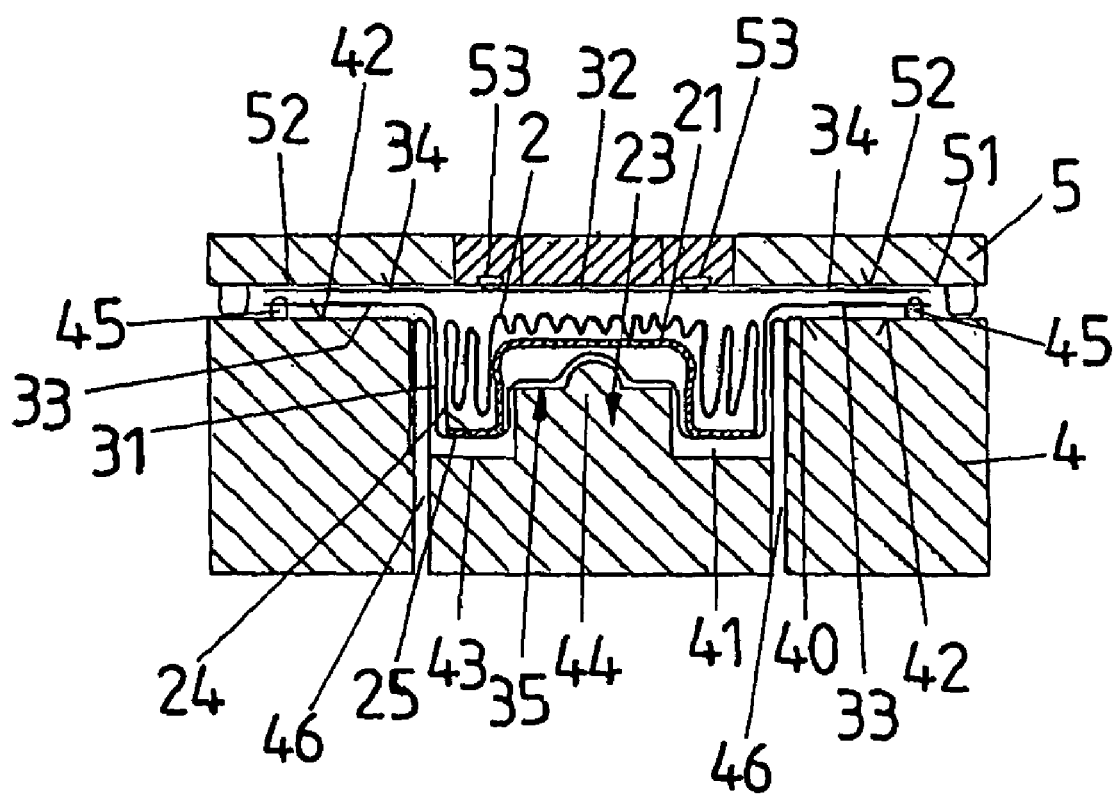
FIG. 5 shows a schematic cross section of a further embodiment of a folding device.

FIG. 5 shows with reference to FIGS. 1 to 4 and the explanations related thereto a further embodiment of a folding device in a cross-sectional view, wherein the forming process of the airbag package 1 is in the state shown in FIG. 3.

As a difference to the folding device shown in FIGS. 1 to 4, the folding device of FIG. 5 comprises an additional hollow cylindrical shaped body 46 as a limiting element. The latter is brought into the recess 41 in order to limit its cross section. Thereby, the cross section of the recess 41 is taken to be the distance that extends in the depiction of FIGS. 1 to 5 from the left edge of the recess 41 to the right edge of the recess 41.

By means of the shaped body 46, the space available to the airbag package 1 that is to be formed is limited. Therefore, airbag packages 1 can be formed in the folding device which are smaller than the recess 41 or comprise a different shape than the latter.

The shaped body 46 must therefore not necessarily be formed hollow cylindrically. It may also comprise an irregular hollow body shaped form, in order to effect a special shape of the airbag package 1.

The priority application, German Patent Application Number 10 2007 043 936.0, filed on Sep. 12, 2007, including the specification, drawings, claims and abstract is incorporated herein by reference in its entirety.

What is claimed is:

1. A method for producing an airbag package for an airbag module using a first tool comprising a recess for receiving the airbag package, which airbag package comprises at least an airbag and a protection covering surrounding the airbag, the method comprising the steps of:
    covering the recess with an evenly outspread first protection covering part of the protection covering,
    folding the airbag, and
    inserting the folded airbag into the recess under interposition of the first protection covering part,
    wherein upon insertion of the airbag package into the recess, the first protection covering part is arranged in the recess under expansion of the first protection covering part.

2. The method according to claim 1, wherein for insertion into the recess the folded airbag is pushed into said recess by means of a second tool.

3. The method according to claim 1, wherein the first protection covering part is fixed to the first tool after covering the recess.

4. The method according to claim 2, wherein a second expandable protection covering part is arranged at a surface of the second tool facing the recess.

5. The method according to claim 4, wherein the second tool is pressed against the folded airbag under interposition of the second protection covering part, so that the folded airbag is arranged between the first and the second protection covering part.

6. The method according to claim 4, wherein a contact area of the second tool is pressed under interposition of a circumferential outer boundary area of the second protection covering part and a circumferential outer boundary area of the first protection covering part against a contact area of the first tool limiting the recess, so that the airbag is enclosed by the two protection covering parts.

7. The method according to claim 6, wherein the two boundary areas of the two protection covering parts are connected to each other, particularly welded to each other.

8. The method according to claim 1, wherein upon arranging the first protection covering part in the recess an area protruding from a bottom of the recess towards the airbag is pressed against the first protection covering part, so that an indentation as an accommodation for a gas generator is formed in the protection covering under expansion of the protection covering.

9. The method according to claim 8, wherein the height of the protruding area with respect to the bottom is variably formable by means of a movement of the protruding area that runs essentially perpendicular with respect to the bottom.

10. The method according to claim 1, wherein prior to folding the airbag a diffuser is arranged in an interior space of the airbag.

11. The method according to claim 1, wherein the protection covering is evacuated, wherein the protection covering tightly adapts to the folded airbag under expansion of the protection covering.

* * * * *